Patented Jan. 5, 1954

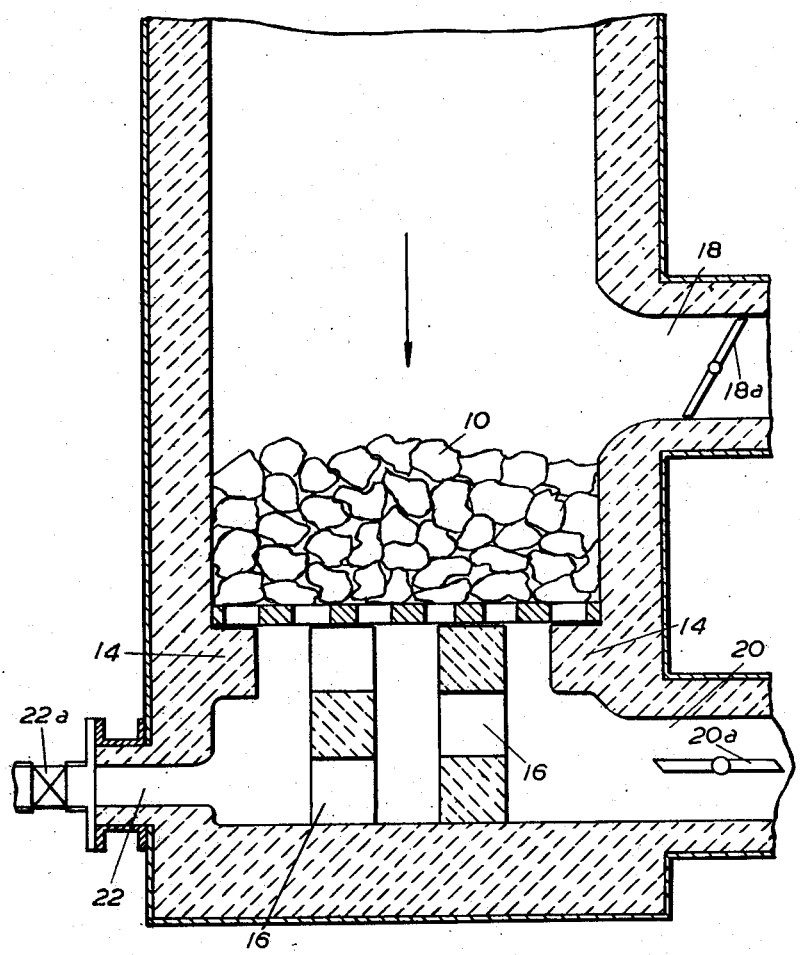

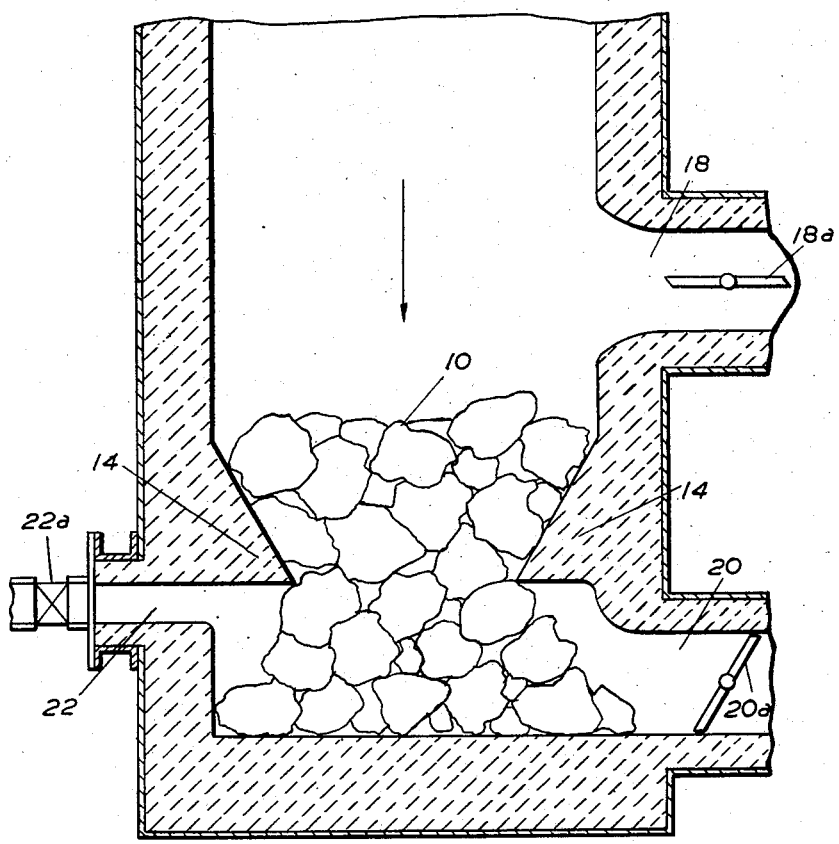

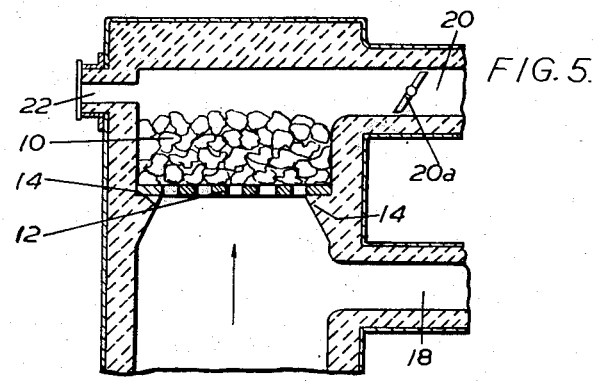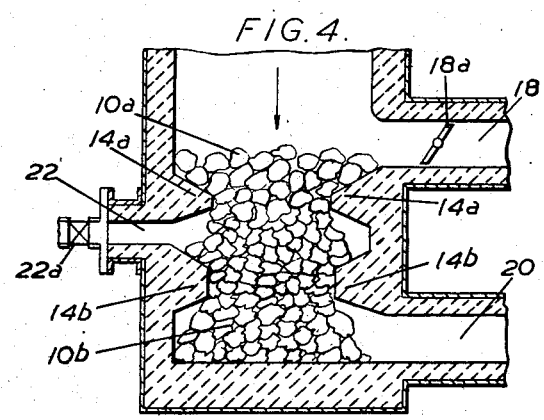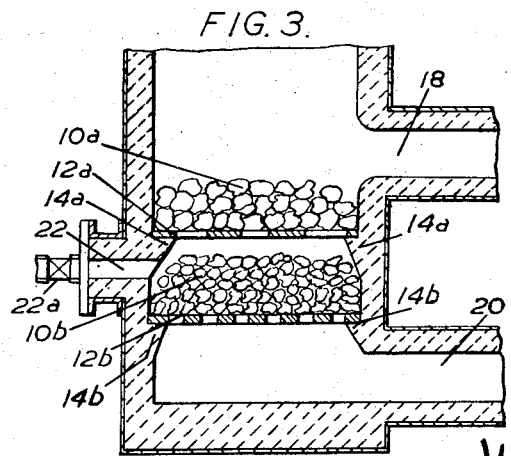

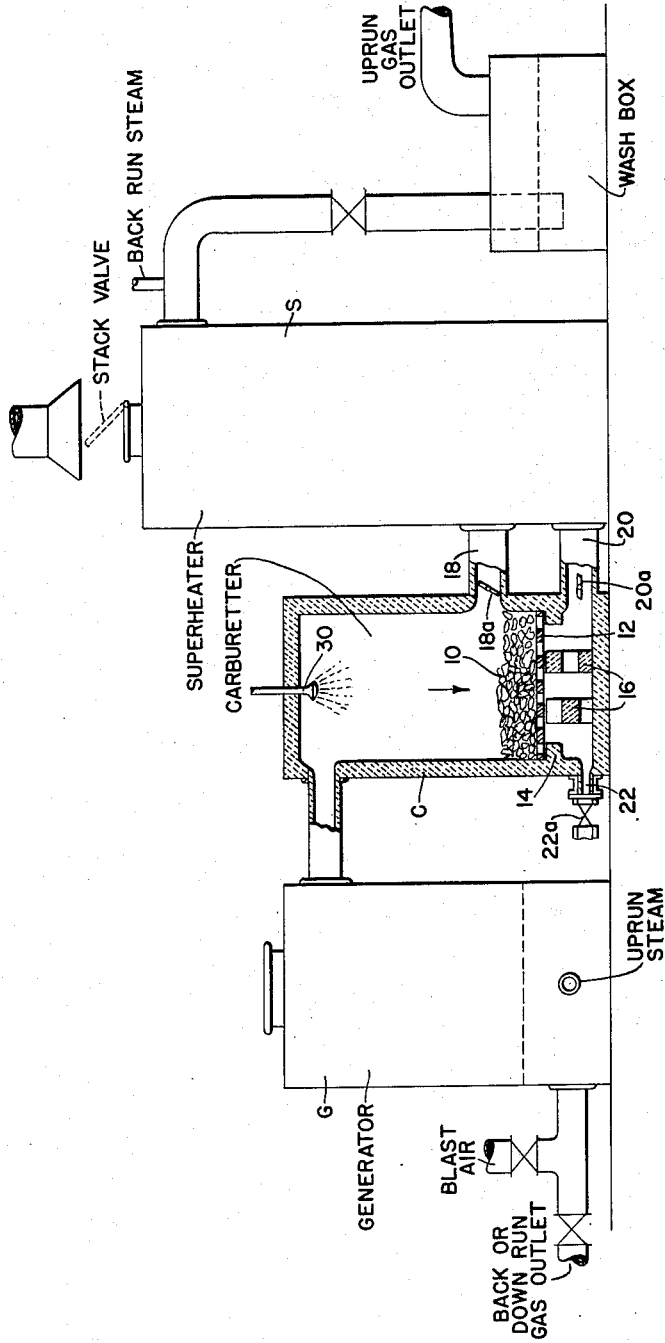

2,665,201

UNITED STATES PATENT OFFICE 2,665,201

MANUFACTURE OF CARBURETED WATER GAS AND IN CARBURETORS FOR USE THEREIN

Norman Henry Williams, Westminster, England, assignor to Humphreys & Glasgow Limited, Westminster, England Application August 29, 1949, Serial No. 112,906

Claims priority, application Great Britain September 16, 1948

1 Claim. (Cl. 48—205)

This invention relates to the manufacture of carburetted water gas by alternately blasting upwardly with air and steaming upwardly a fuel bed in a generator, burning the blow gas and passing it and uprun make gas through a carburetter and superheater, effecting a back run by admitting steam to the superheater and passing it through the superheater, the carburetter and generator in the reverse direction and spraying oil into the carburetter during upward steaming of the generator fuel bed.

When spraying heavy oil into the carburetter of a water gas plant there is difficulty in disposing of the carbonaceous deposits which are formed when incompletely evaporated oil particles come into contact with hot brickwork; moreover, carbonaceous residues from oil droplets which have been completely evaporated out of contact with hot brickwork are normally entrained in the gas and this is undesirable.

According to the present invention unevaporated oil and carbon residues are collected by passing the uprun gas on its way through the carburetter to the superheater through a permeable bed or layer of material; back run steam is passed through the bed or layer in the reverse direction to the uprun gas and, during the blow period or upward blasting of the fuel bed in the generator, air is passed in the same direction as the back run steam through the permeable bed or layer to meet blow gas passing into the superheater from the carburetter.

The carburetter contains no checkerbrick to be encountered by the sprayed oil before it reaches the permeable bed or layer and the oil is sprayed into the carburetter in such manner as to minimise impingement on the walls.

The permeable bed or layer may consist of refractory pieces, or of coke or the like or be of shallow brickwork construction.

By the method described the bed or layer is maintained at a high temperature and oil residues reaching it are evaporated and carbon deposits on or in it combine with the steam or are burned with the air preheated in passing through the first-encountered portion of the bed or layer, only incombustible residues having to be removed from time to time.

If desired, only part of the uprun gases may traverse the bed or layer but there is then a tendency for some unevaporated oil particles to be carried to the superheater instead of being caught by the bed or layer; moreover the bed or layer will not be maintained at such a high temperature.

Also the bed or layer may be traversed by only part of the back run steam.

The invention is applicable to various methods and cycles of operation and in carburetters through which the gases flow downwardly during the blow and uprun gas making periods as well as to those in which the gas flow is upward during those periods.

In a carburetter according to the invention, beyond a gas connection with the superheater there is provided means for supporting a permeable bed or layer of refractory material, coke or like material or of shallow checkerwork construction and on the other side of the bed there is provided a gas collecting space having a second connection to the superheater connected thereto. These connections or only that on the side of the bed or layer furthest from the generator may be valved; the valves may be butterfly valves. A valved air inlet pipe is connected to the space on that side of the bed or layer remote from the generator. Instead of the superheater connection further from the generator being valved the bed may be so arranged as to offer resistance to flow of air from the air inlet through the said connection into the superheater so that at least part of this air is caused to pass through that section of the bed which the oil residues first contact. For instance, between the top and bottom of the bed there may be a space, which may be annular and to which the air inlet pipe is connected.

In a down flow carburetter the support for the bed or layer may be a grate, or a bosh with or without a grate, located above the floor. When no grate is provided, the lower part of the bed or layer then extends through the bosh and rests on the floor and is surrounded by the gas collecting space.

In an up flow carburetter the support is in the form of a grating or the like to permit passage of gas and is located at the upper part of the carburetter.

The refractory bed or layer may be constituted by checkerwork resting on a grate or on arches, or when it is situated at the base of the carburetter, the upper outer courses of brickwork may be supported upon an annular shelf or projections of the carburetter lining while the remaining courses are formed as a central supporting column or pillar resting on the floor of the carburetter.

The carburetters may be provided with doors for giving access to the beds or layers.

The accompanying diagrammatic drawings illustrate the invention.

Fig. 1 is a vertical section of the lower part of a carburetter according to the invention through which the blast gases and uprun gas flow downwardly to the superheater.

Figs. 2, 3 and 4 are similar views of modifications of such a carburetter.

Fig. 5 is a vertical section of the upper part of one form of carburetter according to the invention through which the blast gases and uprun gas flow upwardly to the superheater.

Fig. 6 is an assembly view showing the generator, carburetter, and superheater, and the connections therebetween according to my invention.

In Fig. 1, 10 is a bed or layer of refractory material, coke or the like supported on a grate 12 resting on an annular shelf or series of projections 14 from the carburetter lining some distance above its floor to provide a space as shown. In this space heat storing honeycomb brick structure 16 may be arranged to aid in supporting the grate.

Above the level of the bed 10 a passage 18 connects the carburetter C to the superheater S (Fig. 6) and a passage 20 connects the space below the grate 12 to the superheater S. The passage 18 and 20 may join the superheater S, which may be of any desired construction, at the same or different levels or may merge beyond the valves 18ª and 20ª.

The passage 18 is controlled by a valve 18ª and the passage 20 by a valve 20ª.

22 is an air inlet to the space below the grate 12 and 22ª a valve controlling the admission of air.

Cleaning doors not shown are provided in the neighbourhood of the bed 10.

During the uprun while the gases from generator G are introduced into carburetter C, oil is sprayed into the carburetter C downwardly through pipe 30, or upwardly, and preferably the valve 18ª is closed and the valve 20ª is open so that the gas flows downwardly through the bed 10 and unevaporated oil and carbon residues are held by it. On changing over to the back run, steam preheated in the superheater S enters the carburetter C through the passage 20 and passes upwards through the bed 10.

During at least part of the blow period but, if desired, for the whole of that period, air is admitted through inlet 22, valve 22ª being open for that purpose. During that time valve 20ª is closed and valve 18ª is open so that air flows upwardly through the bed 10 into the superheater S via passage 18, same being preheated by passage through the bed 10 and burning hot deposited carbon which has not been gasified by the steam during the gas making runs.

During that part of the blow period when air is not admitted at inlet 22 the valve 20ª may be open and valve 18ª closed so that all the blow gases pass through the bed 10.

Alternatively both valves 18ª and 20ª may be open simultaneously so that only a portion of the blow gases passes through the bed.

Also the proportion of blow gases passing through the bed 10 may be controlled by any suitable settings of one or both of valves 20ª and 18ª.

In the construction shown in Fig. 2 the projection 14 of the carburetter wall forms a bosh; the bed 10 rests on the floor of the carburetter and extends through the bosh as shown. The valves 18ª and 20ª are shown in the positions they occupy when the valve 22ª is open and air is passing thence through the bed 10 to the superheater.

Figs. 3 and 4 show constructions in which a valve in the passage 20 may be dispensed with.

In Fig. 3 the bed is divided into two portions 10ª and 10ᵇ supported on grates 12ª and 12ᵇ spaced one above the other between the passages 18 and 20; the portion 10ᵇ is shown of greater depth and smaller material than the portion 10ª and offers greater resistance to flow of air from the air inlet 22 to the passage 20 than to the passage 18. Thus a substantial proportion of air admitted through valve 22 is caused to pass through the portion 10ª, which oil residues first contact, to the superheater S through the passage 18. In Fig. 3 no valve is shown in the passage 18 but it is preferred that one shall be provided as shown in Fig. 4 otherwise only a small proportion of the uprun gas and back run steam will pass through the bed.

In Fig. 4, instead of two grates, two boshes 14ª, 14ᵇ are provided and the bed portion 10ª above the air inlet 22 is of less depth than the portion 10ᵇ below it; the size of the material in 10ᵇ, or some of it, may be less than that of the portion 10ª. It is preferred to provide the passage 18 with a valve 18ª as shown.

In Fig. 5 the bed 10 is supported on a grating 12 near the top of the carburetter through which the blast gases and uprun gas flows upwardly, the valved passage 20 and the air inlet 22 being above the bed and the passage 18 below it.

I claim:

In the manufacture of carburetted water gas involving an uprun, a back run, and a blow period, the following steps, spraying oil during the uprun into the uprun make gas as the latter enters the carburetter, subjecting said oil to substantial evaporation in the carburetter and passing the consequently produced mixture of oil vapour and gas, immediately before exit thereof from the carburetter through a carbon arresting filtering medium to arrest unevaporated oil and carbon residues; then passing the superheated steam during the back run through the said filtering medium in the opposite direction from that of the uprun whereby to cause said steam to react with the arrested carbon residues on the medium to form water gas; then passing air through said filtering medium during the blow in the said opposite direction from that of the uprun so as to meet the reaction gases immediately on its emergence from said medium, whereby to cause unevaporated oil and carbon residues arrested by said medium to be burned; and then immediately passing the resulting mixture of reaction gases and combustion products into the superheater.

NORMAN HENRY WILLIAMS.

References Cited in the file of this patent

UNITED STATES PATENTS

| Number | Name | Date |
|---|---|---|
| 1,630,300 | Klein | May 31, 1927 |
| 1,706,686 | Young | Mar. 26, 1929 |
| 1,949,811 | Perry | Mar. 6, 1934 |
| 2,007,200 | Hughes | July 9, 1935 |
| 2,091,240 | Johnson et al. | Aug. 24, 1937 |
| 2,118,332 | Tiddy | May 24, 1938 |
| 2,166,094 | Johnson et al. | July 11, 1939 |
| 2,247,336 | O'Keeffe | June 24, 1941 |